United States Patent [19]

Landolt et al.

[11] 4,138,539

[45] Feb. 6, 1979

[54] PROCESS FOR WATER-SOLUBLE SYNTHETIC POLYMER IN POWDER FORM

[75] Inventors: Paul H. Landolt, Mountain Lakes; Louis N. Allen, Short Hills, both of N.J.

[73] Assignee: American Cyanamid Company, Stamford, Conn.

[21] Appl. No.: 588,460

[22] Filed: Jun. 19, 1975

[51] Int. Cl.² ............................ C08F 6/00; C08F 4/40
[52] U.S. Cl. ...................................... 526/93; 526/218; 526/240; 526/265; 526/303; 528/502; 528/503
[58] Field of Search ............ 260/80 M, 80 P, 80.3 R, 260/80.3 N, 79.3 MU, 86.1 N, 89.7 R; 526/93, 218, 240, 265

[56] References Cited

U.S. PATENT DOCUMENTS

| | | | |
|---|---|---|---|
| 3,058,958 | 10/1962 | Glavis | 260/80.3 N |
| 3,573,263 | 3/1971 | Gill | 260/79.3 MU |
| 3,732,193 | 5/1973 | Svarz | 260/79.3 MU |
| 3,912,607 | 10/1975 | Communal | 204/159.23 |

*Primary Examiner*—C. A. Henderson
*Attorney, Agent, or Firm*—William J. van Loo

[57] ABSTRACT

Polymerization of a water-soluble monomer which forms a water-soluble polymer as an aqueous solution containing free radical and redox system initiators in an advancing polymerization zone followed by staged drying and pulverization provides the polymer in readily dissolved powder form.

10 Claims, 1 Drawing Figure

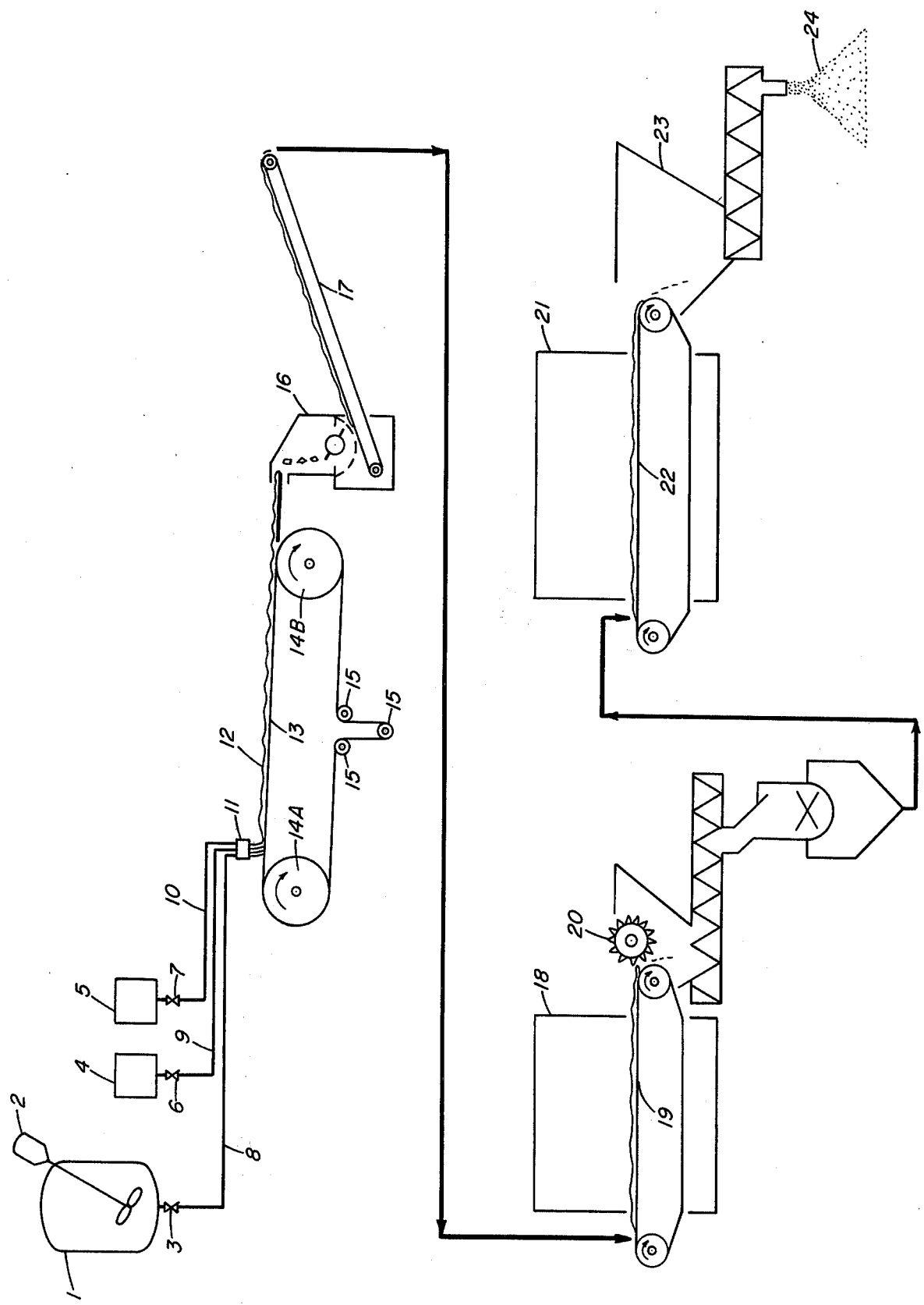

PROCESS FOR WATER-SOLUBLE SYNTHETIC POLYMER IN POWDER FORM

This invention relates to an improved process for preparing a water-soluble synthetic polymer in readily dissolved powder form. More particularly, the invention relates to such a process wherein an aqueous monomer solution is polymerized in an advancing polymerization zone and subjected to staged drying and comminution to provide the readily dissolved water-soluble acrylic polymer.

Water-soluble synthetic polymers such as polyacrylamide and sodium polyacrylate and copolymers thereof are widely useful in a number of applications such as in the flocculation of suspended solids in conjunction with the clarification of various waters. For this and other uses, the most desirable polymers are those of high molecular weight. Because these desired synthetic polymers are water-soluble, a convenient method of preparation is by solution polymerization in water. However, when such technique is employed with the desired water-soluble acrylic polymers of high molecular weight, serious difficulties arise because of the high solution viscosity of the polymers, even at low polymer concentration, i.e. 1–2% polymer solids. Solutions of high molecular weight water-soluble synthetic polymers above about 2% polymer concentration are often rigid gels which are difficult to dilute to provide homogenous solutions for application purposes.

A number of solutions to the problem have been proposed but all have had deficiencies associated therewith which rendered them unattractive for practical use. It was previously proposed to dry the polymer solution so as to provide the polymer in solid powder form. However, the process of drying proposed does not provide a readily dissolved powder and some polymer degradation accompanies the drying procedure. The powdered polymer particles when wet with water tend to stick together and form lumps which are difficult to dissolve. Polymer degradation is evidenced by a considerable proportion of insoluble polymer particles as well as by increases in, for example; acid group content in appropriate polymers as a result of hydrolysis accompanying polymerization and drying.

Another method of providing the polymer in dry powder form consists of precipitating the polymer from water solution by addition of a suitable precipitant, such as methanol, and then drying the polymer to remove the precipitant. The precipitant used in such process is lost in the drain lines and to the atmosphere, thereby adding numerous steps and additional expense to processing while contributing to environmental pollution.

A method of avoiding the high solution viscosities of the polymers prepared comprises emulsifying the aqueous monomer solution so as to form a water-in-oil emulsion and then carrying out the polymerization in the emulsion formed. Subsequently for use, the emulsion is inverted with added water and inversion agent to form an oil-in-water emulsion which releases the polymer to the aqueous phase rapidly as a solution. This procedure has the deficiency of being limited to emulsions of about 30 weight percent of polymer, thus requiring shipment of major amounts of water and oil. The oil is consumed in the final use and can contribute to environmental pollution as well as processing costs.

Thus, although various suggestions have been proposed to overcome the problems associated with the high viscosity of high molecular weight water-soluble synthetic polymers, the deficiencies associated with such suggestions were such as to prevent widespread development of such procedures. Accordingly, there continues to exist the need for an improved process for providing high molecular weight water-soluble synthetic polymers in solid form which is readily dissolved in water while avoiding deficiencies of the former processes. Such a provision would satisfy a long-felt need and provide a notable advance in the art.

In accordance with the present invention, there is provided a process for preparing a high molecular weight water-soluble synthetic polymer in the form of a readily dissolved powder which process comprises: (1) preparing an aqueous monomer solution comprising water, from about 20 to 50 weight percent of a water-soluble ethylenically unsaturated monomer providing a water-soluble polymer, based on the total weight of water and monomer, and from about 100 to 2,000 parts per million based on the total weight of said monomer solution of a free radical initiator; (2) separately preparing an aqueous redox initiator system; (3) mixing said redox system with said monomer solution while introducing said monomer solution into an advancing polymerization zone; (4) maintaining said monomer solution in said polymerization zone at suitable temperature to provide an aqueous polymer gel; (5) removing said polymer gel from said polymerization zone; (6) granulating said polymer gel; (7) partially drying said polymer gel to provide a cake having about 25 to 45 weight percent water; (8) breaking the partially dried polymer cake to provide granules; (9) further drying the granules to reduce the water content to less than about 15 weight percent; and (10) pulverizing the thus-dried polymer.

The process of the present invention provides a readily dissolved water-soluble synthetic polymer and at the same time offers numerous advantages. The process by effecting polymerization in an advancing polymerization zone, which supplies the polymer gel directly to the subsequent granulating and drying steps, eliminates the need for various equipment and handling steps associated with separate polymerization and drying procedures. The process eliminates the need for added precipitant and the deficiencies associated therewith. The process also eliminates or minimizes hydrolysis of the polymer processed. The process provides the polymer in the desired form with minimal unconverted monomer and insoluble particles.

In the sole FIGURE there is shown a schematic drawing illustrating the important features of the process in accordance with preferred embodiments.

In carrying out the process of the present invention, ethylenically unsaturated monomers which are water-soluble are homopolymerized or copolymerized, as desired, to form water-soluble polymers in the form of aqueous gels. Suitable monomers include, for example, acrylamide, acrylic and methacrylic acids and water-soluble salts thereof; alkylaminoalkyl esters of acrylic and methacrylic acids and the corresponding quaternary ammonium derivatives thereof; and 2-vinylimidazoline and 2-vinylpyrimidine and the corresponding quaternary ammonium derivatives thereof. Such monomers may be used alone or in combination with one another.

As the free radical initiator to be incorporated in the monomer solution, use can be made of azobisisobutyronitrile, 4-t-butylazo-4'cyanovaleric acid, 4,4'-azobis(4-cyanovaleric acid, and the like. The free radical initiator should be used in an effective amount which will vary depending upon the choice of monomers employed, the polymerization temperature and residence time, and other variables which preclude setting limits as to the precise quantity of free radical initiator to be used in any given case. However, it has been found that, generally, an amount corresponding to about 100 to 2,000 parts per million of free radical initiator based on the total weight of monomer solution to be polymerized is effective.

The redox system used as polymerization catalyst according to the present system is generally one that is conventionally used. It may be based on a persulfate, for example, a system comprising potassium persulfate and sodium sulfite or on hydrogen peroxide and sodium sulfite. Preferably, ammonium persulfate and ammonium ferrous sulfate are employed. The components of the redox system are separately prepared for addition to the monomer solution when the monomer solution is to be polymerized. The amount of redox system to be employed will also vary widely depending on various factors as indicated with respect to the free radical initiator and cannot be stated in precise quantities to cover every case. However, it has been found that in the case of the preferred system, the use of the persulfate will generally be in the range of about 20–120 parts per million and the use of ferric ammonium sulfate will generally be in the range of 1–25 parts per million based on the weight of monomer.

After preparing the aqueous monomer solution and the separate aqueous components of the redox system, polymerization is next effected. This is conveniently done in an advancing polymerization zone through which the monomer solution is transported while providing the necessary temperature and residence time to provide a polymer of the required molecular weight. The entering monomer solution emerges from the polymerization as a rigid gel of which the polymer generally has a molecular weight in excess of about one million, and, preferably, in excess of about ten million for preferred monomers. The monomer solution enters the polymerization at a relatively low temperature, e.g. about 10° C. and emerges at a relatively high temperature, e.g. about 95° C., with the residence time being adjusted to provide the proper combination of temperature and time to achieve the desired conversion and molecular weight. The actual temperature and time of polymerization will vary widely depending upon numerous factors such as choice of monomer or monomers, solution concentration, initiator and redox system usage, feed rate of monomer solution, and other factors so that a limited specification of temperature and time cannot be given. Generally, the temperature range will vary from about 5° to 100° C. over the entire polymerization zone. Preferably, the temperature peak will be in the range of about 95° to 98° C. Usually, a residence time of about 30 to 120 minutes is effective. When the preferred high temperature peak range is reached, a residence time of about 40 to 75 minutes is generally effective to provide the desired molecular weight values. The monomer solution is deoxidized prior to entry in the polymerization in accordance with conventional procedures. As a result of exposure to the polymerization reaction as described, the monomer solution will generally lose a portion of its water content. The amount of water loss is generally small and in the case where a 30 weight percent monomer solution is initially employed, the resulting polymer gel will usually contain from about 31 to 40 weight percent polymer concentration. Such loss of water has no adverse effects on processing or the polymer product.

The polymer gel obtained as described is in the form of a continuous slab which enters the granulator. The slabs are granulated to provide particles having an average diameter in the range of about ⅛ to ½ inch for partial drying. The slabs are readily granulated using appropriate equipment. The particle size is not especially critical and particles of the size range indicated are readily provided.

The granulated polymer gel is then partially dried to remove water therefrom and provide a composition comprising from about 55 to 75 weight percent polymer. Such drying may be carried out in any manner that will provide the desired polymer content. Generally, such drying is effected at a temperature in the range of about 70°–110° C. for a suitable time period. The actual time of partial drying will vary widely depending upon the drying equipment employed, the drying temperature, and the particular polymer being dried. It is generally preferred to blow heated air through the polymer to aid in the partial drying step. Generally, the partial drying can be carried out in about one hour or less when provision is made for blown air. The product emerging from partial drying is in the form of caked granules.

The caked granules are then broken by means of a suitable cake-breaker to provide granules of the same size range as those initially entered into the partial dryer.

The resulting granules of the partially dried polymer are then subjected to further drying to provide a polymer composition of less than about 15 weight percent water, preferably less than about 12 weight percent water. Such drying may be carried out in any manner that will provide the desired result. It is generally preferred to employ the conditions described above in conjunction with the partial drying step. This further drying step will generally require more time than the partial drying step but the required time will vary widely depending upon those factors mentioned in conjunction with the partial drying step. The further drying step can generally be completed in about 4 to 12 hours usually in conjunction with blown air.

After the further drying step has been completed to the extent desired, the resulting polymer composition is comminuted to provide a free-flowing powder which readily dissolves in water. The polymer product may be hygroscopic and, accordingly, it is desirable to package the freshly ground polymer composition in moisture-proof containers to prevent caking during storage prior to use.

In order to illustrate the invention more fully, the following examples are provided. These examples are described with particular reference to the equipment illustrated in the accompanying drawing. However, it is to be understood that the invention is not to be limited in scope by the specific examples or equipment given and is only limited by the scope of the claims appended hereto. All parts and percentages expressed in the examples are by weight unless otherwise specified.

In the examples which follow, reference is made to "insolubles" and "rapid dissolution". In determining the insolubles content, 0.3 gram of the powder under test is added to a rapidly agitated beaker containing 300 cc of deionized water at 25° C., agitation being sufficient to provide a vortex of about 1 inch in height. Addition is made so that the particles drop into the side of the vortex and addition is made so as to avoid clots of polymer.

After completing addition of the powder, the solution is stirred for an additional 2 hours at a speed which provides a vortex of half the original vortex height. The sample is then screened through a pre-weighed 100 mesh stainless steel gauze. The beaker in which the solution was prepared is washed with water and the wash water is passed through the gauze. The gauze is then dried to constant weight at 110° C. and the insolubles are determined as follows:

% insolubles = (final weight − initial weight) × 30.

In preparing the polymer solution for determining insolubles, the rate of solution can be indicated by visual examination of the beaker contents. If the powder appears to be completely dissolved after 2 hours of stirring or less, it is classified as "rapidly dissolving".

EXAMPLE 1

Using the basic equipment depicted in the drawing, a sample of a powdered polymer composition was prepared.

The monomer solution was prepared at 31.5% total monomer content and consisted of 22% sodium acrylate and 78% acrylamide. To 2957.39 kilograms of water was added 264.64 kilograms of acrylic acid and 147.03 kilograms of NaOH to provide the sodium acrylate content. The additions were made to a reactor 1 equipped with a stirrer 2, so as to effect solution. Then 1225 kilograms of acrylamide were added and dissolved. Finally, there were added 2.475 kilograms of azobisisobutyronitrile with 2.297 kilograms of methanol as dissolution aid therefor. The pH of the monomer solution was 7.5.

The redox system employed consisted of separate aqueous solutions of ferrous ammonium sulfate and ammonium sulfate prepared in tanks 4 and 5 of the FIGURE. Tank 4 contained 0.26525 gram per liter of ferrous ammonium sulfate and tank 5 contained 0.75840 gram per liter of ammonium persulfate.

The usage of azobisisobutyronitrile was 721 parts per million based on the total weight of monomer. Sufficient solution of ferrous ammonium sulfate was provided to supply 6.33 parts per million based on the total weight of monomer and sufficient solution of ammonium persulfate was provided to supply 31.1 parts per million based on the total weight of monomer.

The monomer feed was metered through valve 3 to a spray head 11 to provide a feed rate of 2.0 kilograms per minute. The redox system was simultaneously metered through valves 6 and 7 to provide the necessary parts per million of ferrous ammonium sulfate and ammonium persulfate indicated.

The supply lines of monomer solution and redox system to the spray head are designated by 8, 9, and 10, respectively. The resulting mixed solution is shown as 12 carried on the advancing belt 13 rotated by pulleys 14A and 14B and containing gravity take-up 15. The first pulley 14A is at a higher elevation than the second pulley 14B so that the monomer solution tends to advance toward the exit end of the polymerization zone by gravity while it remains liquid. The belt is concave across its lateral dimensions so that the monomer solution is retained within the concavity. In start-up, a dam of previously prepared gel is not necessary on the belt to prevent undue migration of the monomer solution forwardly along the belt. The belt revolves within a confined zone, not shown, with adequate provision for reaching and holding a desired polymerization temperature. Before start-up of the reaction, the monomer solution and redox system is degassified and the polymerization zone is purged with nitrogen.

The mixture of monomer solution with redox system was entered into the polymerization at a temperature of 10° C. The belt speed was such that it required 88 seconds to travel a distance of 1 foot in linear direction, which provided a residence time of 65 minutes within the polymerization zone. At about midpoint in the polymerization zone, the formed polymer gel was at a temperature of 96° C. and this temperature was maintained the remaining distance of the advancing polymerization. In the initial portion of the polymerization, the monomer solution quickly formed a gel, the temperature rising slowly over a distance of about the first one-fourth of the polymerization zone to about 40° C., then rapidly in the second one-fourth of the zone to about 96° C. The emerging gel had a polymer content of 35.6%.

The polymer gel emerging from the polymerization was conveyed to a granulator 16 which converted the slab-like polymer gel to granules having an average particle size of about 5/16 inch diameter. The granules were then conveyed by conveyer 17 to the partial drying oven 18 through which the granules were conveyed by means of belt 19. The dryer was maintained at a temperature of 85° C. and was equipped with a blower, not shown, which forced hot air through the gel granules. After drying for one hour in such fashion, the polymer content of the resulting partially dried gel was increased to 60%.

The partially dried polymer gel which emerged from dryer 18 was caked and the cake was broken by cake-breaker 20 and converted into 5/16 inch granules for further drying. The granules which emerged from the cake-breaker 20, were conveyed to dryer 21 through which they were conveyed by belt 22. The temperature of dryer 21 was also maintained at 85° C. and hot air was blown through the polymer granules by a blower not shown. After a residence time of 1.5 hours in dryer 21 the polymer granules had their moisture content reduced to 8.4%. The polymer granules emerging from dryer 21 were deposited in comminuter 23 for pulverization and emerged as a fine powder at exit port 24.

The final polymer powder had a moisture content of 11%, contained no insoluble particles, and had a free monomer content of 0.02%. A 0.1% polymer solution was readily prepared and had a viscosity of 4.5 centipoises at 25° C. The resulting polymer had a molecular weight in excess of 10,000,000. The polymer contained 78% acrylamide and 22% sodium acrylate after drying, the same ratio as in the monomer solution. The molecular weight of the dried polymer was substantially the same as that of the initial polymer gel obtained, indicating no polymer degradation occurred as a result of drying.

EXAMPLE 2

The procedure of Example 1 was followed in every material detail except that the monomer solution contained a monomer mixture consisting of 97.5% acrylamide and 2.5% sodium acrylate.

The polymer gel obtained had a polymer gel of 32.2% polymer. The final dried polymer had a moisture content of 9.9% and readily dissolved in water to provide a solution viscosity at 0.1% polymer content of 4.34 centipoises at 25° C. The free monomer content was 0.03% and 0.4% of insolubles were present in dried powder. The polymer had a molecular weight in excess of 10,000,000 and the same ratio of acid groups as in the monomer solution.

Example 3

The procedure of Example 1 was followed in every material detail except that the monomer solution contained a monomer mixture of 41.5% sodium acrylate and 58.5% acrylamide.

The polymer gel obtained had a polymer content of 33.9%. The final dried polymer had a moisture content of 14.7%, a free monomer content of 0.03%, and an insolubles content of 1.3%. The polymer powder readily dissolved in water to provide a 0.1% polymer solution of 5.00 centipoises at 25° C. The polymer had a molecular weight in excess 10,000,000.

EXAMPLE 4

Following the procedure of Example 1 in every material detail, a homopolymer is made of acrylamide. In this instance, readily water-soluble powder of similar properties to those of the polymer powder obtained in Example 1 are obtained.

EXAMPLES 5–8

Again following the procedure of Example 1, a series of polymer powders are prepared. The monomer compositions of each run are given in Table I.

Table I

| Example | Monomer Composition |
|---------|---------------------|
| 5 | 25% dimethylaminoethylacrylate and 75% acrylamide |
| 6 | 25% 2-vinylimidazoline and 75% acrylamide |
| 7 | 25% 2-vinylpyrimidine and 75% acrylamide |
| 8 | 25% dimethylaminoethylacrylate quaternarized with dimethyl sulfate and 75% acrylamide |

In each instance, a powdered readily water-soluble polymer is obtained having properties similar to those of Example 1.

Comparative Example A

Following conventional procedure, a polymer gel of the composition of that of Example 1 was prepared using conventional amounts of a redox system as the polymerization catalyst.

The polymer gel was dried to 15% water content using a conventional drum dryer. The dried polymer obtained contained 9% insolubles, required about twice as much time to dissolve as the polymer powder of Example 1, and had about a 10 percent increase in acid group content due to hydrolysis during drying. The molecular weight of the dried polymer decreased by about 10% from that of the initial polymer gel indicating considerable polymer degradation as a result of drying.

We claim:

1. A process for preparing a high molecular weight water-soluble synthetic polymer in the form of a readily dissolved powder which process comprises: (1) preparing an aqueous monomer solution comprising water, from about 20 to 50 weight percent of a water-soluble ethylenically unsaturated monomer providing a water-soluble polymer, based on the total weight of water and monomer, and from about 100 to 2,000 parts per million based on the total weight of said monomer solution of a free radical initiator; (2) separately preparing an aqueous redox initiator system; (3) mixing said redox system with said monomer solution while introducing said monomer solution into an advancing polymerization zone; (4) maintaining said monomer solution in said polymerization zone at suitable temperature to provide an aqueous polymer gel; (5) removing said polymer gel from said polymerization zone; (6) granulating said polymer gel; (7) partially drying said polymer gel to provide a cake having about 25 to 45 weight percent water; (8) breaking the partially dried polymer cake to provide granules; (9) further drying the granules to reduce the water content to less than about 15 weight percent; and (10) pulverizing the thus-dried polymer.

2. The process of claim 1 wherein the monomer solution contains a mixture of acrylamide and sodium acrylate.

3. The process of claim 1 wherein in conjunction with said partial drying step (7) hot air is blown through the polymer particles.

4. The process of claim 1 wherein in conjunction with said partial drying step (7) and said further drying step (9) hot air is blown through the polymer particles.

5. The process of claim 1 wherein the free radical initiator is azobisisobutyronitrile.

6. The process of claim 1 wherein said redox initiator system consists of ferrous ammonium sulfate and ammonium persulfate.

7. The process of claim 1 wherein said polymerization zone is at a temperature in the range of about 10° to 100° C.

8. The process of claim 1 wherein said polymerization zone is maintained at a temperature in the range of 93° to 98° C.

9. The process of claim 1 wherein said monomer solution provides a homopolymer of acrylamide.

10. The process of claim 1 wherein said monomer solution provides a homopolymer of sodium acrylate.

* * * * *